United States Patent
Jones

(10) Patent No.: US 6,889,960 B1
(45) Date of Patent: May 10, 2005

(54) CONNECTORS AND RAILING SYSTEM HAVING METAL BALUSTERS ISOLATED FROM CORROSION

(76) Inventor: Kelly D Jones, 708 Heatherstone Dr., High Ridge, MO (US) 63049

( * ) Notice: Subject to any disclaimer, the term of this patent is extended or adjusted under 35 U.S.C. 154(b) by 0 days.

(21) Appl. No.: 10/713,540

(22) Filed: Nov. 14, 2003

(51) Int. Cl.⁷ .............................................. E04H 17/14
(52) U.S. Cl. ............................... 256/65.03; 256/65.04; 256/19; 256/21; 411/508; 411/510
(58) Field of Search .................................. 411/338, 339, 411/512, 907, 908, 508–510; 256/65.01, 59, 65.03, 65.04, 19, 21–22

(56) References Cited

U.S. PATENT DOCUMENTS

| | | | |
|---|---|---|---|
| 1,797,883 A | | 3/1931 | Strubel |
| 3,065,342 A | * | 11/1962 | Worden .................. 411/907 X |
| 3,319,918 A | * | 5/1967 | Rapata .................... 411/907 X |
| 3,740,083 A | * | 6/1973 | Zenhausem ............. 411/913 X |
| 3,810,341 A | | 5/1974 | Holz |
| 4,403,767 A | | 9/1983 | Basey |
| 4,886,245 A | | 12/1989 | Manzo |
| 5,419,538 A | | 5/1995 | Nicholas et al. |
| 5,474,395 A | | 12/1995 | Miki |
| 5,690,454 A | * | 11/1997 | Smith ..................... 411/908 X |
| 6,126,148 A | | 10/2000 | Lesenskyj |
| 6,305,670 B1 | | 10/2001 | Ward et al. |
| 6,308,937 B1 | | 10/2001 | Pettit |
| 6,311,957 B1 | | 11/2001 | Driscoll et al. |
| 6,394,422 B1 | | 5/2002 | Jones et al. |
| 6,602,034 B2 | * | 8/2003 | Wakai et al. ........... 411/908 X |

* cited by examiner

Primary Examiner—John R. Cottingham
(74) Attorney, Agent, or Firm—Grace J. Fishel

(57) ABSTRACT

A railing system for porches, decks, steps, ramps and the like having a top and bottom rail formed of wood containing a wood preservative that is corrosive to aluminum, aluminum alloys, paint and the like. The system has hollow metal balusters formed of metals which may be harmed by the corrosive effects of the wood preservative. The metal balusters and, if painted, the paint is protected from the corrosive effects of the wood preservatives by inert connectors interposed between the wooden components of the railing system and the metal or paint of the balusters. The connectors are also useful with untreated wood such as cedar or with synthetic materials.

15 Claims, 3 Drawing Sheets

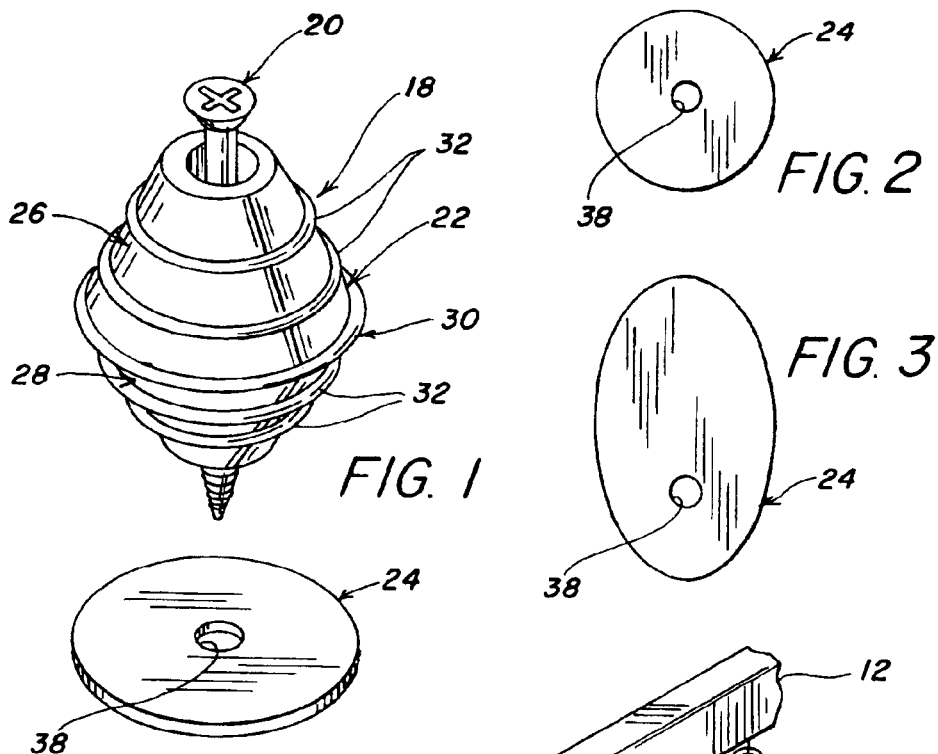
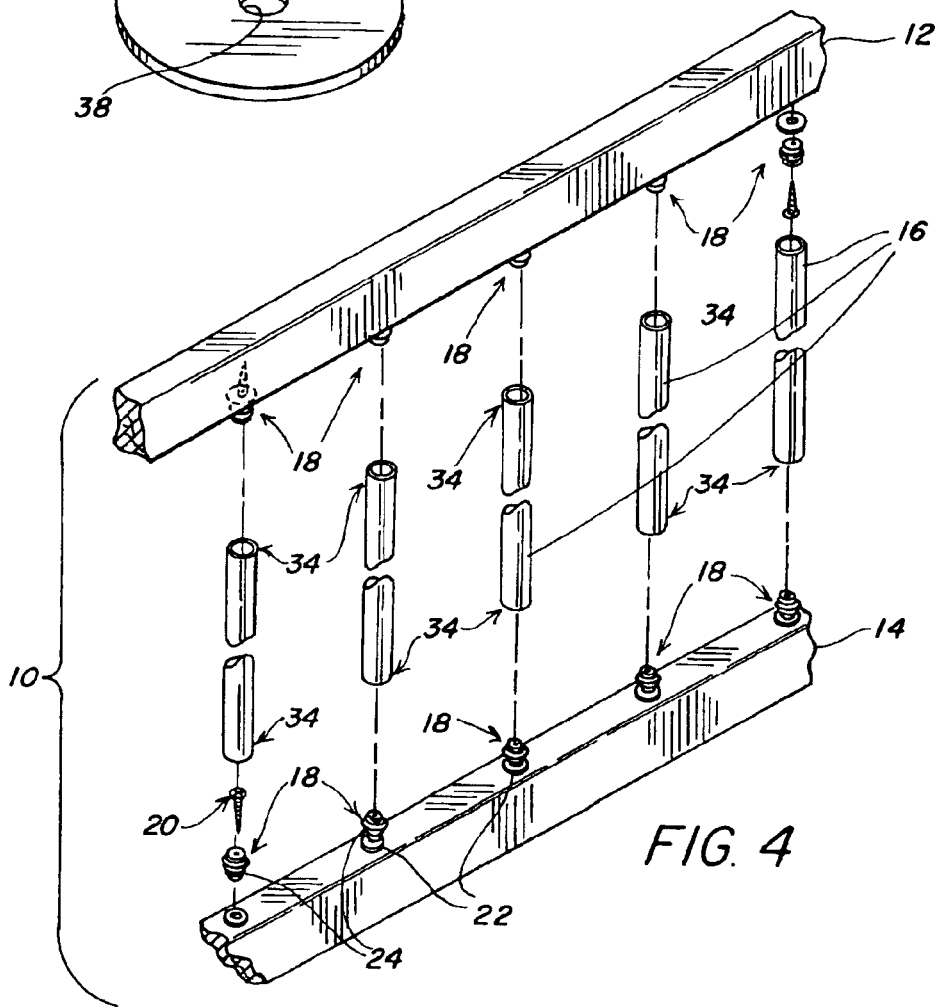

CONNECTORS AND RAILING SYSTEM HAVING METAL BALUSTERS ISOLATED FROM CORROSION

BACKGROUND OF THE INVENTION

1. Field of the Invention

The present invention relates to connectors for use in forming railings made with treated lumber and tubular metal balusters wherein the balusters are isolated from corrosion by the lumber.

2. Brief Description of the Prior Art

It has been found that an attractive fence or railing resembling a wrought iron fence can be made with hollow metal balusters mounted in holes drilled in top and bottom wood rails. One such construction is described in U.S. Pat. No. 6,394,422 to Jones et al. which is incorporated by reference herein.

In recent years there has been a change in the chemicals employed for treating lumber used outside. Arsenic, the primary component used to preserve wood from deterioration, in the form of copper chromated arsenic (CCA), has been banned. Newly developed arsenic free treatments include alkaline copper quaternary (ACQ) and copper azole (CA). These treatments, however, contain approximately six times more copper than CCA.

Galvanic corrosion occurs when dissimilar metals are in contact with each other in the presence of an electrolyte. The increased copper content in new wood preservatives has caused metal balusters when formed of aluminum to corrode, especially at the point of contact with the wood. The problem of corrosion is increased in an outdoor environment where the components are exposed to moisture, i.e., from rain, dew and other sources.

Metal balusters formed of aluminum are painted. It has been found that the alkaline in the ACQ is used as a paint remover. Hence ACQ may be expected to corrode the paint as well as cause galvanic corrosion of the aluminum of metal balusters in contact with wood treated with ACQ.

U.S. Pat. Nos. 1,797,883, 3,810,341, 4,403,767, 4,886,245, 5,419,538, 5,474,395, 6,126,148, 6,305,670, 6,308,937, 6,311,957, and 6,394,422 are incorporated by reference herein.

BRIEF SUMMARY OF THE INVENTION

In view of the above, it is an object of the present invention to provide a connector for protecting metal balusters from metal or paint corrosion in a railing. It is another object to provide a connector that can be used to easily and rapidly construct horizontal or inclined railings. Other objects and features of the invention will be in part apparent and in part pointed out hereinafter.

A connector for use in isolating painted tubular metal balusters from rails formed of wood treated with a wood preservative that is corrosive to the tubular metal balusters or from a wood preservative that is corrosive to the paint is formed of a chemically inert material and comprises a body and a disk.

The body has an upper frustum with a base and a lower frustum with a base. The upper and lower frustums are joined at their bases and the body is adapted to conform and wedge into an end of a tubular metal baluster. The disk is adapted for placement under the lower frustum and against an end of the tubular metal baluster when the body is wedged into the end of tubular metal baluster. The upper frustum has a central cavity for receipt of a fastener for joining the body and the disk to a wooden rail with the disk acting as a corrosion barrier between the baluster and the wood rail.

The connectors described above may be used to form a railing having a top rail and a bottom rail. The top rail and the bottom rail are spaced apart and formed of wood, the wood treated with a wood preservative. Hollow metal balusters extend between the top and bottom rails, with connectors isolating the tubular metal balusters from the rails.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is a perspective view of a connector in accordance with the present invention;

FIG. 2 is a plan view of a disk portion of the connector for use with horizontal rails;

FIG. 3 is a plan view of a disk portion of the connector for use with inclined rails;

FIG. 4 is an exploded perspective view of a railing system in accordance with the present invention;

DETAILED DESCRIPTION OF THE INVENTION

Figure 5:
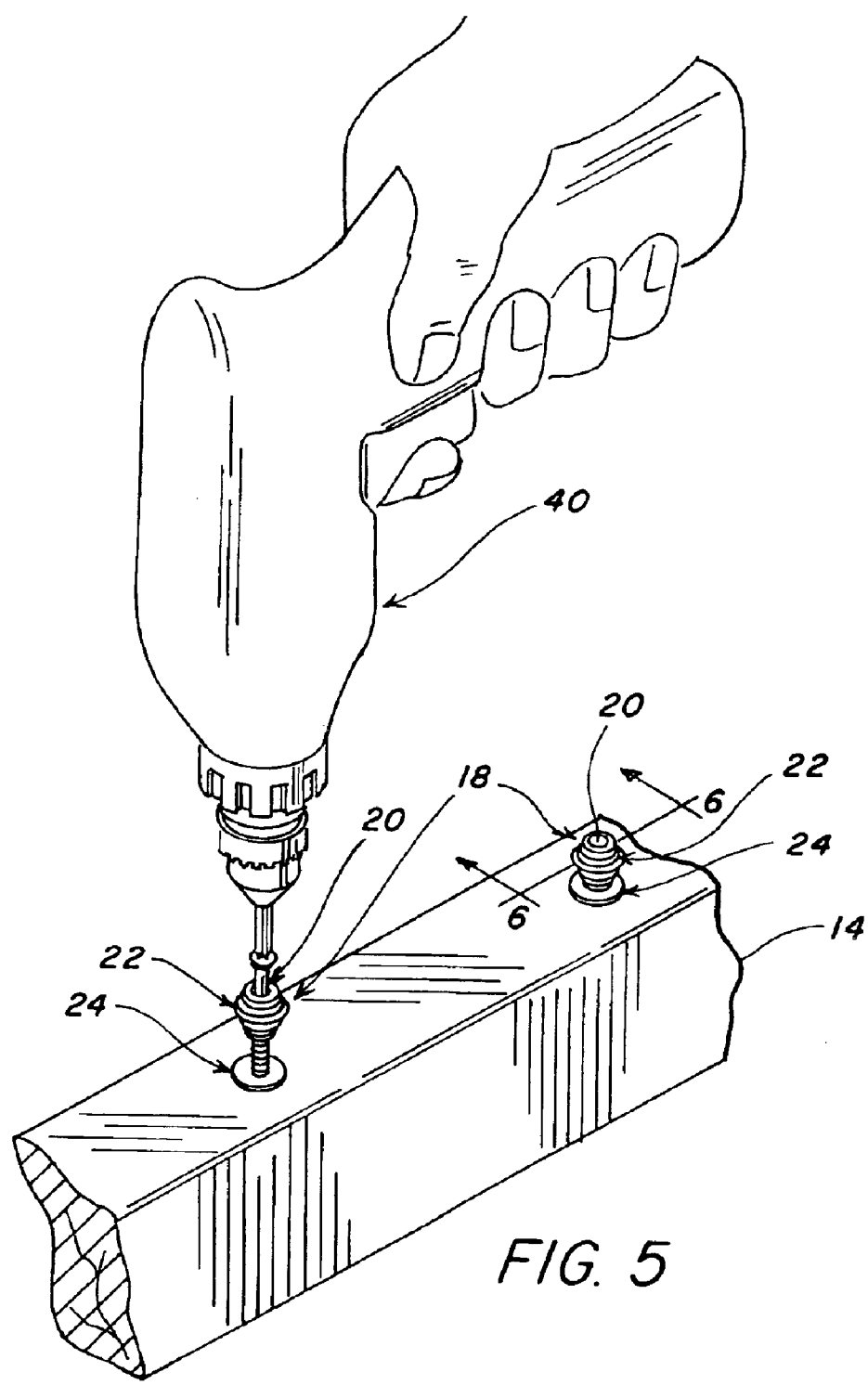
FIG. 5 is a perspective view of the connector being installed on a rail.

Referring to the drawings more particularly by reference character starting with FIG. 4, reference numeral 10 refers to a railing in accordance with the present invention. Railing 10 has a horizontal top rail 12 and a horizontal bottom rail 14 with a plurality of balusters 16 placed between top and bottom rails 12, 14. Balusters 16 may be made from straight sections of round aluminum tubing, but it will be appreciated that they may be made from another material, such as another metal, and may have a different cross-section and/or a more complex shape.

Balusters 16 are installed on rails 12, 14 using connectors 18 of the invention. Connectors 18 are installed on rails 12, 14 using fasteners 20 such as screws, nails or the like. Connectors 18 are installed at appropriate intervals along bottom rail 14 as shown in FIG. 4, and balusters 16 are placed over connectors 18 with connectors 18 snugly received in the bottoms of balusters 16. Connectors 18 are also installed along top rail 12 at matching intervals and top rail 12 lowered to place its connectors snugly into the tops of balusters, as shown.

Figure 6:
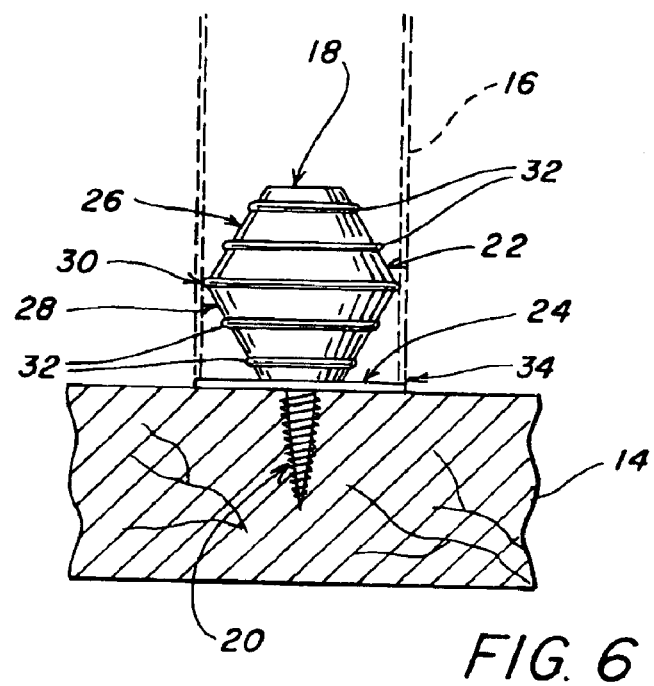
FIG. 6 is a cross-section on enlarged scale taken along the plane of 6—6 in FIG. 5; and, FIG. 7 is a cross-section similar to FIG. 6 but where the rail is inclined.
Figure 7:
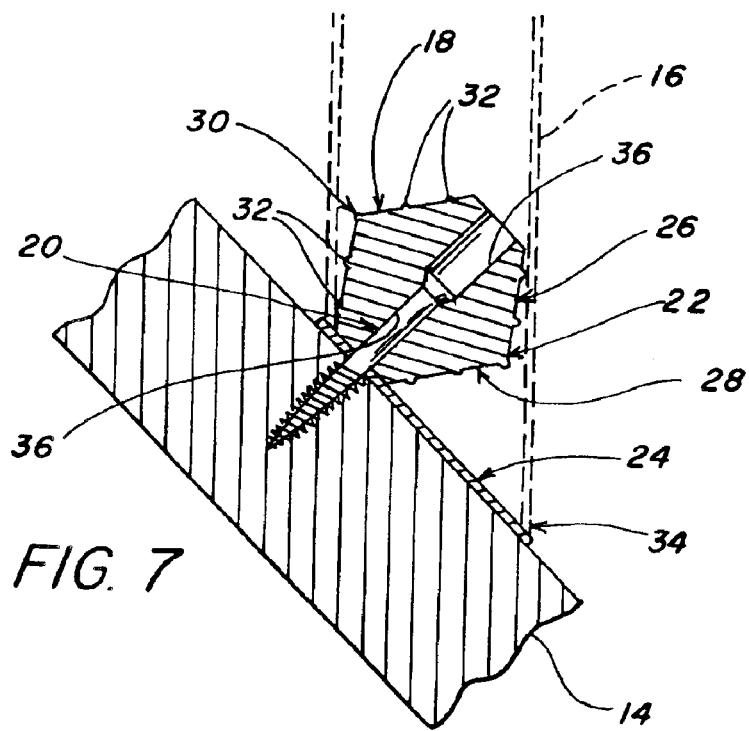

Turning to FIGS. 1–3 and 6–7, connectors 18 include a body 22 and a disk 24 formed of a chemically inert material. Nonconductive ceramics, glass, rubber compounds and plastics may be used. Preferred materials are chemically inert or corrosion resistant polymers such as polyethylenes, polypropylenes, vinyl polymers, polyamide\nylon polymers, polyethers and polyesters, including mixtures and copolymers thereof. These materials are strong, durable and inexpensive and possess the preferred balance of flexibility and rigidity. The flexibility of the elastomer provides sufficient compliance to allow connector 18 to distort to conform to inclined top and bottom rails 12, 14 as shown in FIG. 7 and more discussed below.

With continuing reference to FIGS. 1–3 and 6–7, body 22 is a solid shaped with an upper frustum 26 joined to the base of a lower frustum 28. Frustums 26, 28 may be conical, pyramidal, etc. A central ridge 30 may be formed about body 22 where the bases of upper and lower frustums 26, 28 are joined. Additional ridges 32 may be provided above and below central ridge 30 for uses that will become apparent. Body 22 is adapted to conform and wedge into an end 34 of one of tubular metal balusters 16 as best seen in FIGS. 6–7. In FIG. 6, body 22 is wedged on at least central ridge 30 when end 34 is square cut for use on horizontal rails 12, 14. When end 34 is angled for use on inclined rails 12, 14 which are installed along steps or ramps, as is known in the art, body 22 may be wedged along other on other parts of body 22, as shown in FIG. 7. Additional ridges 32 may be useful and may be provided for this purpose. Also as shown in FIG. 7, body 22 may have a central cavity 36 for recessed receipt of fasteners.

Disk 24 is adapted for placement under lower frustum 28 of body 22 and against end 34 of tubular metal baluster 16. When end 23 of tubular metal baluster 16 is square cut for use on horizontal rails 12, 14 as shown in FIGS. 4–6, disk 24 is circular and may include a preformed hole 38 through which fastener 20 is received. But when end 34 is angled for use on inclined rails 12, 14 as shown in FIG. 7, disk 24 is oval. In both instances, however, disk 24 forms a barrier between end 34 of tubular metal baluster 16 and the wood rail which may have been treated with a wood preservative such as copper chromated arsenic (CCA), the use of which was banned by the EPA as of Dec. 31, 2003 for pressure treated wood for residential use, alkaline quaternary (ACQ), copper azole (CA) and the like.

As shown in FIG. 5, connector 18 may be readily installed on rails 12, 14 using a power driver 40. Manual drivers such as a screw driver when fastener 20 is a screw, a hammer when fastener 20 is nail and so forth may also be used. In such operations, fastener 20 is received in central cavity 36 and extends through a passageway 42 in lower frustum 28 and through hole 38 in disk 24 which is either preformed or punched by fastener 20. In place, end 34 of tubular metal baluster 16 can be wedged over connector 18 with disk 24 acting as a corrosion barrier by keeping balusters 16 out of contact with rails 12, 14 which may contain a corrosive wood preservative.

While connectors 18 were developed for use with wooden rails treated with preservatives, they may be used with untreated wood such as cedar or with synthetic materials. With these materials, connectors 18 provide for easy assembly of railing 10 without drilling rails 12, 14 to receive balusters 16. This is a significant advantage in the case of synthetic materials which may be soft and weakened by drilling. It will therefore be understood that connecters 18 used with rails 12, 14 which do not corrode painted tubular metal balusters 16 are within the patent claims to the connectors and to the railing system.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A connector for use in isolating painted tubular metal balusters from rails formed of wood treated with a wood preservative that is corrosive to the tubular metal balusters or from a wood preservative that is corrosive to the paint, said connector formed of a chemically inert material and comprising a body and a flat disk, said body having an upper member having a frustoconical shape with a top and a base and a lower member having a frustoconical shape with a top and a base, said upper and lower members joined at their bases, said body adapted to conform and wedge into an end of a tubular metal baluster; and, said flat disk adapted for placement under the lower member and against an end of the tubular metal baluster when the body is wedged into the end of tubular metal baluster, said upper member having a central cavity for receipt of a fastener for joining the body and the disk to a wooden rail, said disk acting as a corrosion barrier between the baluster and the wood rail.

2. The connector of claim 1 wherein a central ridge is formed about the body where the members are joined, said body adapted to wedge into an end of a tubular metal baluster on at least the central ridge.

3. The connector of claim 2 wherein one or more additional ridges are formed on the upper and lower member spaced from the central ridge.

4. The connector of claim 1 wherein the chemically inert material is a chemically inert polymer selected from the group consisting of polyethylenes, polypropylenes, polyamides, polyvinyls, polyesters and polyethers including mixtures and copolymers thereof.

5. The connector of claim 4 wherein the flat disk is circular for use when the rail is horizontal.

6. The connector of claim 5 wherein the flat disk is oval for use when the rail is inclined.

7. A railing system having a top rail and a bottom rail, the top rail and the bottom rail being spaced apart and formed of wood, the wood treated with a wood preservative, the railing system having painted hollow metal balusters extending between the top and bottom rails, the railing system having means for protecting the hollow metal baluster from the corrosive effects of the wood preservative, the protecting means being placed between the ends of the hollow metal balusters and the top and bottom rails.

8. The railing system of claim 7 wherein the protecting means has means for joining the protecting means to the top and bottom rails.

9. The railing system of claim 7 wherein the protecting means is formed from a chemically inert polymer selected from the group consisting of polyethylenes, polypropylenes, polyamides, polyvinyls, polyesters and polyethers including mixtures and copolymers thereof.

10. A railing system having a top rail and a bottom rail, the top rail and the bottom rail being spaced apart and formed of wood, the wood treated with a wood preservative, the railing system having painted hollow metal balusters extending between the top and bottom rails, a plurality of connectors for use in isolating the tubular metal balusters from the rails, each connector formed of a chemically inert polymer and comprising a body and a disk, said body having an upper frustum with a base and a lower frustum with a base, said upper and lower frustums joined at their bases with a central ridge formed about the body where the frustums are joined, said body adapted to conform and wedge into an end of one of the tubular metal balusters on at least the central ridge; and, said disk adapted for placement under the lower frustum and against the end of the tubular metal baluster when the body is wedged into the end of tubular metal baluster, said upper frustum having a central cavity for receipt of a fastener for joining the body and the disk to one of the wooden rails, said disk acting as a corrosion barrier between the baluster and the wood rail.

11. The railing system of claim 10 wherein the connectors have one or more additional ridges formed on the upper frustum spaced above the central ridge.

12. The railing system of claim 11 wherein the connectors have one or more additional ridges formed on the lower frustum spaced below the central ridge.

13. The railing system of claim 12 wherein the connectors are formed from a chemically inert polymer selected from the group consisting of polyethylenes, polypropylenes, polyamides, polyvinyls, polyesters and polyethers including mixtures and copolymers thereof.

14. The railing system of claim 10 wherein the disks of the connectors are circular for use when the top and bottom rails are horizontal.

15. The railing system of claim 10 wherein the disks of the connectors are oval for use when the top and bottom rails are inclined.

* * * * *